United States Patent
Grbovic et al.

(10) Patent No.: US 8,319,457 B2
(45) Date of Patent: Nov. 27, 2012

(54) ENERGY RECOVERY DEVICE IN A VARIABLE-FREQUENCY DRIVE

(75) Inventors: Petar Grbovic, Vernon (FR); Philippe Baudesson, La Boissiere (FR); Philippe Le Moigne, Nomain (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 20 days.

(21) Appl. No.: 13/062,716

(22) PCT Filed: Oct. 12, 2009

(86) PCT No.: PCT/EP2009/063275
§ 371 (c)(1),
(2), (4) Date: Mar. 8, 2011

(87) PCT Pub. No.: WO2010/046262
PCT Pub. Date: Apr. 29, 2010

(65) Prior Publication Data
US 2011/0199801 A1    Aug. 18, 2011

(30) Foreign Application Priority Data
Oct. 21, 2008 (FR) ................................ 08 57141

(51) Int. Cl.
*H02P 23/10* (2006.01)
(52) U.S. Cl. ........................ 318/268; 363/131
(58) Field of Classification Search .............. 318/139, 318/254, 400.22, 400.24, 400.3, 438, 268.257, 318/442, 504; 363/23, 40, 44, 55, 74, 95, 363/131
See application file for complete search history.

(56) References Cited

U.S. PATENT DOCUMENTS

| | | | | |
|---|---|---|---|---|
| 5,373,195 A * | 12/1994 | De Doncker et al. | ........... | 307/45 |
| 5,574,345 A * | 11/1996 | Yoneta et al. | ............... | 318/376 |
| 6,046,896 A * | 4/2000 | Saeki et al. | ...................... | 361/86 |
| 6,701,103 B2 * | 3/2004 | Nakaya | .......................... | 399/88 |
| 7,352,154 B2 * | 4/2008 | Cook | ............................ | 320/116 |
| 2001/0017234 A1 | 8/2001 | Suga et al. | | |
| 2006/0066283 A1 | 3/2006 | Ota et al. | | |
| 2006/0267527 A1 | 11/2006 | Khopkar et al. | | |
| 2008/0031019 A1* | 2/2008 | Alexander | ...................... | 363/37 |
| 2011/0057587 A1 | 3/2011 | Baudesson et al. | | |

FOREIGN PATENT DOCUMENTS
EP    1 641 110    3/2006

OTHER PUBLICATIONS
International Search Report issued Apr. 1, 2010 in PCT/EP09/63275 filed Oct. 12, 2009.

* cited by examiner

*Primary Examiner* — Walter Benson
*Assistant Examiner* — Iftekhar Mustafa
(74) *Attorney, Agent, or Firm* — Oblon, Spivak, McClelland, Maier & Neustadt, L.L.P.

(57) ABSTRACT

A variable-frequency drive that includes a DC power supply bus with a positive line and a negative line, and an inverter module powered by the DC bus for supplying a variable voltage to an electric load. The inverter includes a first DC/DC converter including output terminals connected in series on the positive line of the DC bus, a second DC/DC converter including input terminals connected between the positive line and the negative line of the DC bus, a filtering capacitor connected in parallel to the input terminals of the first converter and to the first output terminals of the second converter, and an electric power storage module connected in parallel to the second output terminals of the second converter.

9 Claims, 4 Drawing Sheets

ENERGY RECOVERY DEVICE IN A VARIABLE-FREQUENCY DRIVE

Figure 1:
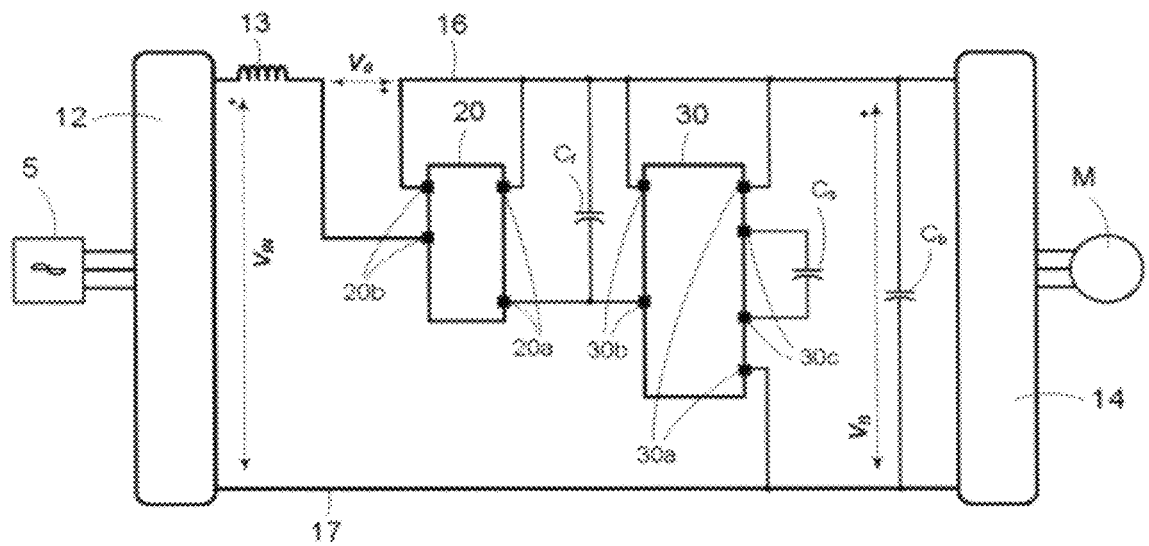

The present invention pertains to a variable speed drive comprising an energy recovery device incorporating a module for storing the recovered energy. A variable drive such as this is used in particular to operate an electric motor in applications having frequent accelerations and decelerations such as lifting applications or position regulating applications.

An energy recovery device customarily serves to be able to store energy when the motor is in braking mode (or recovery mode), and then to return the energy thus stored when the motor is in drive mode, and optionally to provide backup energy in the case of brief outage of the network supply to the variable drive.

Prior documents such as U.S. Pat. No. 6,742,630, U.S. Pat. No. 6,938,733, WO2006/016002 or EP1586527A1 already propose energy recovery solutions associated with a variable speed drive. The existing topologies are generally based on an additional power converter and an energy storage module, in which the power converter is linked in parallel to the DC power bus of the variable speed drive. The energy storage module often comprises one or more "super-capacitors" or a combination of a "super-capacitor" and a battery.

The term "super-capacitor" or "ultra-capacitor" designates a hardware item which is capable of storing a more significant quantity of electrical energy than a conventional capacitor, close for example to a battery of electrochemical type, but which can also permit significant charge and discharge currents like a conventional capacitor, in contradistinction to a battery of electrochemical type.

In the present document, the term "active switch" refers to a switch the opening and/or closing of which are controlled, such as a transistor, a thyristor or a triac. Conversely, the term "passive switch" refers to a switch which operates spontaneously, such as a diode.

The existing solutions do not make it possible to amplify (or boost) the DC bus voltage to a value greater than the voltage provided at rectifier output by the network supplying the variable drive. Likewise, the DC bus voltage cannot be regulated to decrease the oscillations of the DC bus voltage so as to reduce the degree of distortion of the motor currents and therefore the torque ripple when the voltage applied at the output of the inverter is a maximum. Moreover, the current absorbed by the rectifier cannot have a degree of total harmonic distortion of current (THDI) of below 30%. Moreover, the usage factor of the switches used in the energy recovery device is not optimized.

The objective of the invention is therefore to propose a variable speed drive comprising an energy recovery device so as to save energy and improve the performance of the variable drive and not exhibiting the above drawbacks. In particular, the energy recovery device must in particular make it possible to:

recover and store electrical energy when the variable speed drive operates in braking mode and return this stored electrical energy to the variable drive.

reduce to about 30% the degree of total harmonic distortion of current (THDI) on the phases of the supply network on input to the variable drive.

remove the variations of this DC bus voltage (ripple free function) at the level of the network frequency (about 50 Hz), despite any disturbances in the external supply network, even in the case of a variable drive not comprising any bus capacitor (C-less topology). Regulating the voltage of the DC bus makes it possible in particular to have a better control of the torque and of the flux of the motor.

increase if necessary the voltage delivered by the rectifier module of the variable drive (boost function) so as to provide the voltage of the DC bus, thereby making it possible to have an energy reserve. This increase is represented by the amplification factor which is the ratio of the voltage of the DC bus to the voltage at the output of the rectifier module.

For this purpose, the invention describes a variable speed drive comprising a DC power supply bus furnished with a positive line and with a negative line, and an inverter module supplied by the DC bus so as to provide a variable voltage to an electric load. The variable drive comprises a first DC/DC converter comprising input terminals and output terminals, the output terminals of the first converter being connected in series on the positive line of the DC bus, a second DC/DC converter comprising input terminals, first output terminals and second output terminals, the input terminals of the second converter being connected between the positive line and the negative line of the DC bus, a filtering capacitor which is connected in parallel to the input terminals of the first converter and to the first output terminals of the second converter, and an electrical energy storage module which is connected in parallel to the second output terminals of the second converter.

According to one characteristic, the electrical energy storage module comprises one or more super-capacitors, or the electrical energy storage module comprises one or more super-capacitors in series with a filtering inductor.

According to another characteristic, the first DC/DC converter is a non-isolated monodirectional converter which comprises an active switch and a passive switch. The passive switch of the first converter is a diode which is connected between the output terminals of the first converter, and the assembly formed by the active switch and the passive switch linked in series is connected in parallel to the input terminals of the first converter.

According to another characteristic, the second DC/DC converter is a non-isolated bidirectional converter which comprises a cell composed of four active switches linked in series between the positive line and the negative line of the DC bus, the cell comprising a central mid-point between the second and the third active switch, a high mid-point between the third and the fourth active switch, and a low mid-point between the first and the second active switch.

The positive line of the DC bus and the central mid-point form the first output terminals of the second converter, and the high mid-point and the low mid-point form the second output terminals of the second converter.

According to another characteristic, the second DC/DC converter also comprises two voltage control diodes mounted in series between the positive line of the DC bus and the central mid-point, as well as a load capacitor linked in series between the low mid-point and a mid-point of the two voltage control diodes.

According to another characteristic, the variable drive also comprises a filtering assembly linked between the positive line and the negative line of the DC bus, the filtering assembly being composed of two bus capacitors linked in series and one of the two capacitors of the filtering assembly corresponding to the filtering capacitor.

Advantageously, the invention describes a solution which uses a super-capacitor, as energy storage module, whose minimum voltage across its terminals is not directly related to the desired amplification factor (boost function). Indeed, when the voltage across the terminals of the super-capacitor influences the amplification factor, then this voltage must have, in the normal operating mode (motor mode), a minimum value sufficient to comply with this amplification factor. However, in load braking mode and in energy return mode, the voltage across the terminals of the super-capacitor increases up to generally about twice this minimum voltage value. This implies that the hardware items, in particular the active switches, must therefore be dimensioned to withstand high voltage values and this entails significant costs for the hardware items used in such a device.

Figure 2:
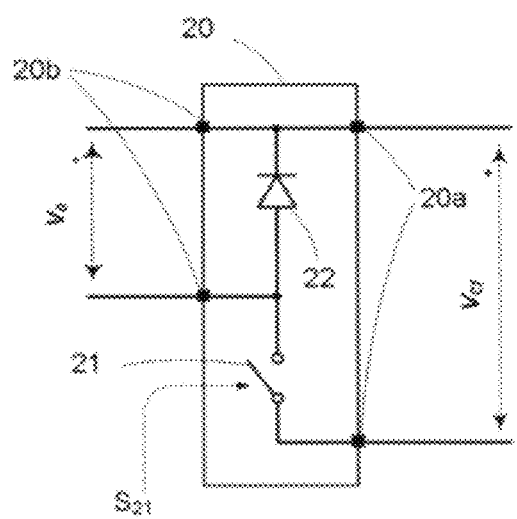
Figure 3:
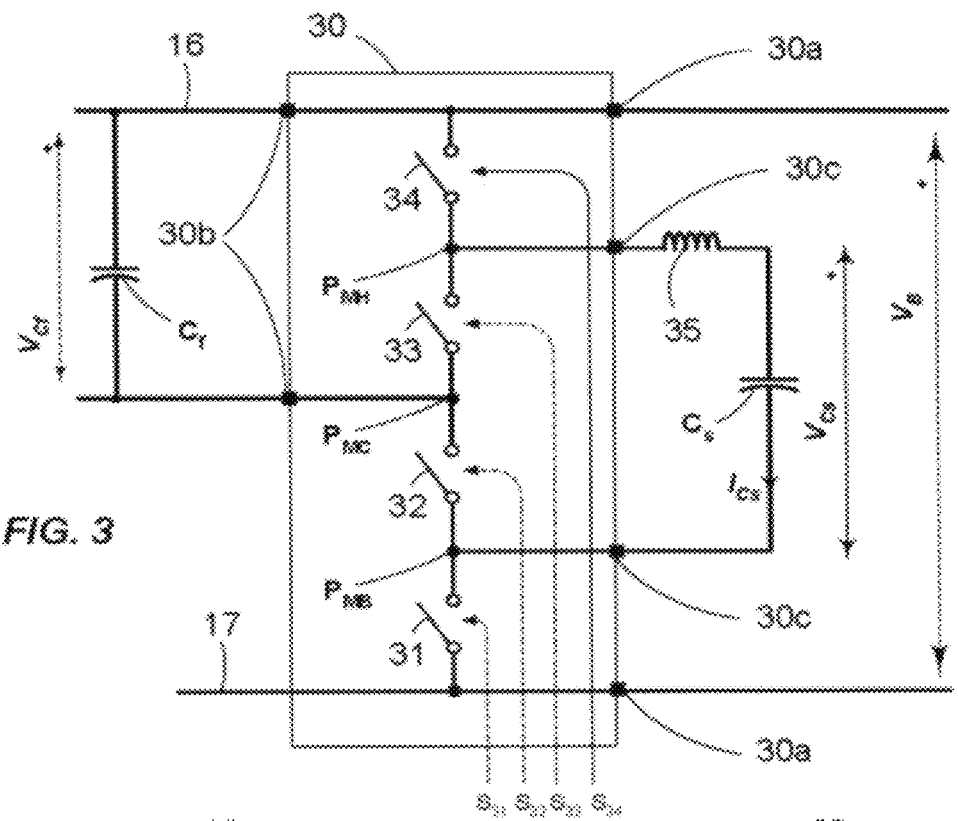
Figure 4:
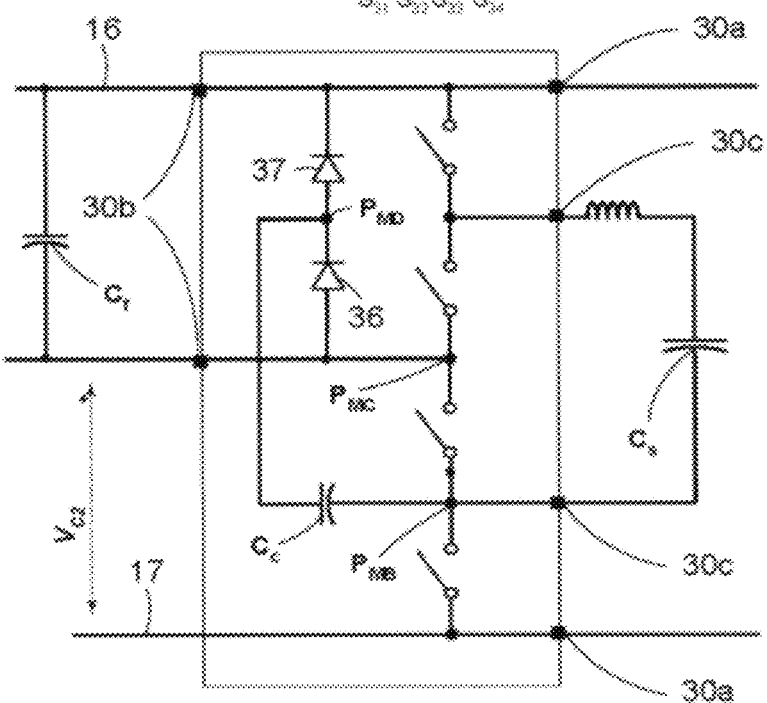
Figure 5:
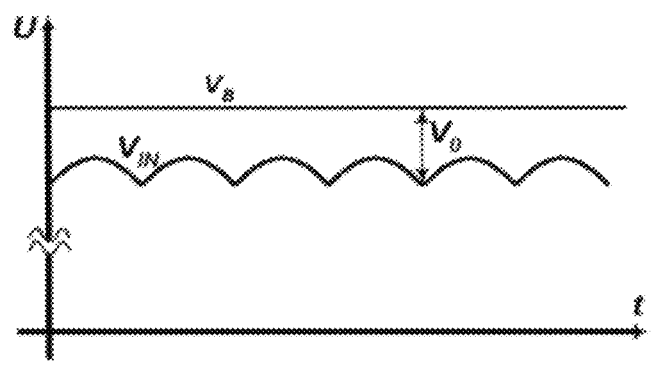
Figure 6:
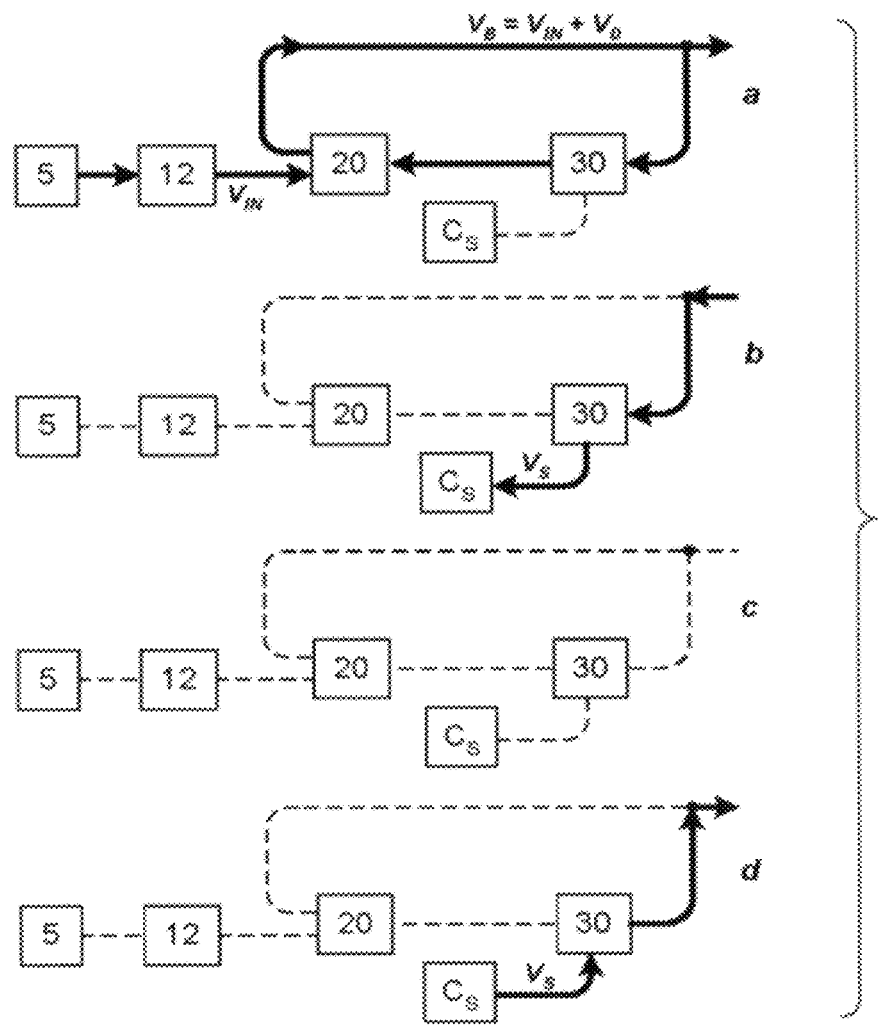
Figure 7:
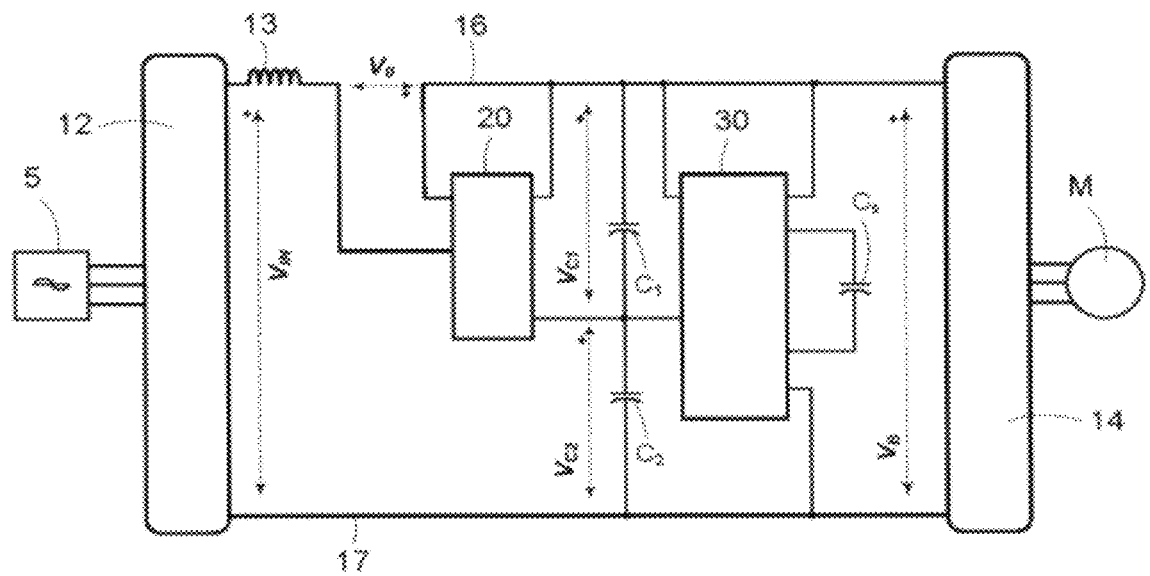
Figure 8:
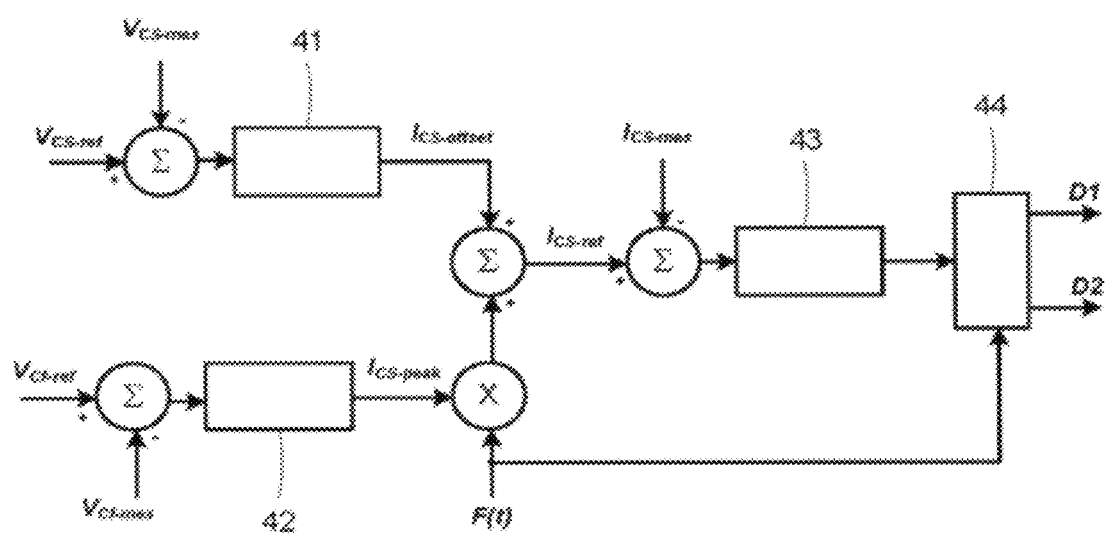

Other characteristics and advantages will appear in the detailed description which follows while referring to an embodiment given by way of example and represented by the appended drawings in which:

FIG. 1 shows a simplified example of the architecture of a variable speed drive in accordance with the invention, FIG. 2 details a preferred embodiment of the first DC/DC converter, FIG. 3 shows a first embodiment of the second DC/DC converter, FIG. 4 shows a second embodiment of the second DC/DC converter, FIG. 5 represents a diagram of the DC bus voltage and of the rectified voltage, FIGS. 6a to 6d illustrate the various modes of operation of the variable drive, FIG. 7 details a variant of the architecture of FIG. 1, FIG. 8 shows an example of control schematic for the active switches of the second DC/DC converter.

With reference to FIG. 1, a variable speed drive, of frequency-converter type, is supplied by an exterior three-phase supply network 5. The variable drive comprises a rectifier module 12 delivering as output a rectified voltage $V_{IN}$ which is intended to form a DC power supply bus composed of a positive line 16 and of a negative line 17. Preferably, the rectifier module 12 uses diodes and does not require any thyristors. It could also be envisaged that the rectified voltage $V_{IN}$ originate directly from an exterior DC supply source, without necessitating any rectifier module 12. Preferably, an additional filtering inductor 13 of low value is placed in series, at the output of the positive terminal of the rectifier module 12.

The variable drive thereafter comprises an inverter module 14 supplied by the DC bus and delivering a variable voltage to an exterior electric load M, in particular a synchronous or asynchronous electric motor. Such an inverter module 14 customarily comprises power transistors which are operated by control signals originating from a control unit (not represented in the figures) for the variable speed drive. The variable drive also generally comprises a bus capacitor $C_B$ connected between the positive 16 and negative 17 lines of the DC bus, for example on the side of the inverter module 14. The DC voltage across the terminals of this bus capacitor $C_B$ is called the bus voltage $V_B$.

The variable drive comprises an energy recovery device intended to recover and store electrical energy when the electric load M becomes driving (motor braking) and intended thereafter to return the stored electrical energy. According to the invention, the energy recovery device comprises a first DC/DC converter 20, a second DC/DC converter 30, a filtering capacitor Cf and a module for storing electrical energy Cs.

With reference to FIG. 2, the first DC/DC converter 20 comprises an input stage formed by two input terminals 20a and an output stage formed by two output terminals 20b. With reference to FIGS. 3 and 4, the second DC/DC converter 30 comprises an input stage formed by two input terminals 30a, a first output stage formed by two first output terminals 30a and a second output stage formed by two second output terminals 30b.

The output stage 20b of the first converter 20 is linked in series on the DC bus positive line 16, between the filtering inductor 13 and the bus capacitor $C_B$. One of the output terminals 20b is linked to the filtering inductor 13 or to the positive output of the rectifier module 14, if there is no inductor 13. The other output terminal 20b is linked to the bus capacitor $C_B$. There exists a voltage $V_0$ between the two terminals 20b, in such a way that: $V_B=V_{IN}+V_0$, ignoring the voltage across the terminals of the inductor 13. The input terminals 20a of the first converter 20 are connected in parallel with the filtering capacitor Cf.

Preferably, the first converter 20 is a simple non-isolated monodirectional DC/DC converter as indicated in FIG. 2. It receives as input a voltage Vf of the filtering capacitor Cf and delivers as output the voltage $V_0$ on the positive line 16 of the DC bus. The first converter 20 simply comprises a passive switch 22 in series with an active switch 21. The active switch is for example a power transistor 21 of IGBT, MOSFET or other type, and the passive switch is a diode 22 whose anode is placed on the active switch 21 side. The power transistor 21 is operated by a control signal $S_{21}$ originating from the variable speed drive control unit. The control signal $S_{21}$ is a pulse width modulation (PWM) signal which makes it possible in particular to vary the output voltage $V_0$ of the first converter 20.

The output stage 20b of the first converter 20 is connected directly to the terminals of the diode 22, and the input stage 20a of the first converter 20 is connected directly to the terminals of the assembly formed by the power transistor 21 and the diode 22 linked in series. The diode 22 is therefore linked in series on the positive line 16 of the DC bus and the voltage $V_D$ across the terminals of the diode 22 is equal to the output voltage $V_0$ of the first converter 20.

When the power transistor 21 is open (OFF state), then the current of the DC bus flows in the diode 22. The voltage $V_D$ across the terminals of the diode is therefore zero, therefore $V_0=0$ and $V_B=V_{IN}$. When the power transistor 21 is closed (ON state), the current flows in the transistor 21 and the voltage $V_D$ then becomes equal to the voltage of the filtering capacitor Cf, called $V_{Cf}$, therefore $V_B=V_{IN}+V_{Cf}$. The output voltage $V_0$ therefore varies between 0 and Vf and is always positive or zero. Thus, by acting on the control signal $S_{21}$ of the power transistor 21, it is possible to regulate and to boost the voltage of the DC bus $V_B$ and the current flowing in the inductor 13, as indicated in FIG. 5, with the aid of the voltage $V_{Cf}$.

The filtering capacitor Cf may be any type of capacitor. It is connected in parallel to the input terminals 20a of the first converter 20 and in parallel to the first output terminals 30b of the second converter 30. Moreover, one of the ends of the filtering capacitor Cf is linked to the positive line 16 of the DC bus. Thus, the input terminals 20a of the first converter 20 are connected directly to the first output terminals 30b of the second converter 30. This filtering capacitor Cf serves in particular as source of potential between the first converter 20 and the second converter 30.

With reference to FIGS. 3 and 4, the second converter 30 is a bidirectional DC/DC converter which is non-isolated. However, an isolated bidirectional DC/DC converter could also be used. The input terminals 30a of the second converter 30 are connected between the positive line 16 and the negative line 17 of the DC bus, downstream of the first converter 20, that is to say between the first converter 20 and the inverter module 14. It therefore receives as input the voltage $V_B$ of the DC bus.

The first output terminals 30b of the second converter 30 are connected to the filtering capacitor Cf and to the input terminals 20a of the first converter 20, as indicated previously.

The second output terminals 30c of the second converter 30 are connected to the electrical energy storage module Cs. The second converter 30 therefore delivers as output a voltage, called $V_{Cs}$, to the storage module Cs. The storage module comprises for example a super-capacitor Cs or several super-capacitors in series, so as to allow the storage of a large quantity of electrical energy and to allow high charge/discharge currents. The storage module could also comprise other storage elements such as a battery, a flywheel or a superconducting magnetic energy store (SMES).

In the example of FIGS. 3 and 4, the storage module additionally comprises a filtering inductor 35 linked in series with the super-capacitor Cs. This filtering inductor 35 makes it possible in particular to limit the variation of the current flowing in the super-capacitor Cs, due to the frequent switchings in the second converter 30 during the charging or discharging of the super-capacitor Cs. Moreover, for high frequencies (of the order of some ten KHz, for example), the inductor 35 makes it possible to transform the super-capacitor Cs from a voltage source into a current source.

FIG. 3 shows a first embodiment of the second converter 30. It comprises a switching cell composed of four active switches 31, 32, 33, 34 which are connected to one another in series between the positive line 16 and the negative line 17 of the DC bus. The first switch 31 is hooked up between the negative line 17 and the second switch 32. The second switch 32 is linked to the third switch 33 and the fourth switch 34 is hooked up between the third switch 33 and the positive line 16 of the DC bus.

In a preferred manner, the active switches 31, 32, 33, 34 are bidirectional current switches such as power transistors of IGBT, MOSFET or JFET type, each furnished with a free wheel diode in parallel (not represented in the figures). The active switches 31, respectively 32, 33, 34 are operated by control signals $S_{31}$, respectively $S_{32}$, $S_{33}$, $S_{34}$ originating from the variable speed drive control unit. The control signals $S_{31}$, $S_{32}$, $S_{33}$, $S_{34}$ are for example pulse width modulation (PWM) signals.

The four active switches 31, 32, 33, 34 form between themselves several intermediate connection points, as indicated in FIG. 3. A central mid-point $P_{MC}$ is positioned between the second switch 32 and the third switch 33, in the middle of the switching cell. A low mid-point $P_{MB}$ is positioned between the first switch 31 and the second switch 32, and a high mid-point $P_{MH}$ is positioned between the third switch 33 and the fourth switch 34.

The positive line 16 of the DC bus and the central mid-point $P_{MC}$ of the switching cell form the first output terminals 30b of the second converter 30. The high mid-point $P_{MH}$ and the low mid-point $P_{MB}$ of the switching cell form the second output terminals 30c of the second converter 30. Thus, the two second output terminals 30c are linked to the DC bus via the switches 31 and 34.

This simple embodiment of the second converter 30 exhibits the advantage of being very economical and of not using passive hardware items, while regulating the output voltages $V_{Cf}$ and $V_{Cs}$ with respect to the bus voltage Vb, by adjusting the control of the four active switches 31, 32, 33, 34. The voltages $V_{Cf}$ and $V_{Cs}$ are nonetheless coupled together, the consequence of which is that the current passing through the super-capacitor Cs contains an AC component with mean frequency (between 1 to 5 kHz approximately) whose amplitude depends on the amplification factor of the first converter 20. This may create additional losses in the super-capacitor Cs and therefore reduce the effectiveness of the energy recovery device. However, this disadvantage will become minor with the rapid progress in super-capacitor technologies.

The various cases of operation of the energy recovery device are illustrated in FIGS. 6a to 6d:

The normal mode of operation (FIG. 6a—motor mode) corresponds to a mode where the variable drive is supplied by the exterior network 5, via the rectifier 12, and uses the energy provided by the network 5 to supply and drive the load M. The bus voltage $V_B$ is maintained constant and greater than the rectified voltage $V_{IN}$ by virtue of the contribution of the voltage $V_0$ output by the first converter 20. As indicated in FIG. 5, the role of the voltage $V_0$ is therefore to increase the rectified voltage $V_{IN}$ of the rectifier module 12 (boost function) and to cancel the ripple of the rectified voltage $V_{IN}$ (ripple-free function). Another significant function of the first converter 20 is to maintain the current flowing in the inductor 13 practically constant, despite possible variations in the supply voltage of the exterior network 5. In this mode, there is no energy exchange between the super-capacitor Cs and the variable drive. The voltage $V_{Cf}$ is regulated by the second converter 30 (with the aid of the control signals $S_{31}$, $S_{32}$, $S_{33}$, $S_{34}$) at a value which is for example half the bus voltage $V_B$.

FIG. 6b corresponds to the braking mode, in which the variable drive recovers and stores the electrical energy provided by the load M when the latter is driving (such as an elevator motor in the descent phase). This recovered braking energy makes it possible to charge the super-capacitor Cs. The role of the second converter 30 is to regulate the bus voltage $V_B$ and to increase the voltage $V_{Cs}$ across the terminals of the super-capacitor Cs. In this mode, the control signal $S_{21}$ maintains the active switch 21 in the open state.

FIG. 6c corresponds to a mode where no energy is consumed or recovered by the load M (stand-by mode).

FIG. 6d corresponds to the return mode, in which the energy stored up in the super-capacitor Cs during the braking mode is returned to the variable drive by virtue of the second converter 30. In this mode, the energy stored in the super-capacitor Cs is sent back to the load M and the voltage $V_{Cs}$ therefore decreases until it attains the minimum value $V_{Csmin}$. In this mode, the control signal $S_{21}$ maintains the active switch 21 in the open state. When the voltage $V_{Cs}$ attains the minimum value $V_{Csmin}$, the load M must again be supplied from the exterior network 5 and the variable drive therefore reverts to the normal operating mode 6a.

In the first embodiment (FIG. 3), the voltages $V_{Cf}$ and $V_{Cs}$ are coupled together, as indicated previously. FIG. 8 shows an example of schematic of the control/regulation algorithm for the voltages $V_{Cf}$ and $V_{Cs}$, executed in the variable speed drive control unit, which makes it possible to generate the control signals for the four active switches of the second converter 30.

A first control block 41 receives as input the discrepancy between a reference setpoint $V_{Cs-ref}$ of the voltage $V_{Cs}$, and a measurement $V_{Cs-mes}$ of this voltage $V_{Cs}$. To minimize this discrepancy, the output of the first control block 41 provides an evaluation of the DC component $I_{Cs-offset}$ of the current $I_{Cs}$ flowing in the storage module Cs. This current $I_{Cs-offset}$ corresponds to the mean value of the current $I_{Cs}$. The current $I_{Cs-offset}$ is zero during the motor mode, is positive during the braking mode (charging of Cs) and is negative during the return mode (discharging of Cs).

A second control block 42 receives as input the discrepancy between a reference setpoint $V_{Cf-ref}$ of the voltage $V_{Cf}$, and a measurement $V_{Cf\text{-}mes}$ of this voltage $V_{Cf}$. To minimize this discrepancy, the output of the second control block 42 provides an evaluation of the peak current $I_{Cs\text{-}peak}$ of the AC component of the current $I_{Cs}$ flowing in the storage module Cs. This peak current $I_{Cs\text{-}peak}$ must be positive in the motor mode so as to act on the current flowing in the filtering capacitor Cf and therefore so as to be able to regulate the voltage $V_{Cf}$. The current $I_{Cs\text{-}peak}$ is zero in the braking and return mode.

The current $I_{Cs\text{-}peak}$ is thereafter multiplied by a function F(t), which is for example the simple square function F(t) =sgn(sin 2πft), where f represents the frequency of the AC component of the current $I_{Cs}$ and sgn(x) is equal to 1 if x>0 and is equal to −1 if x<0.

The sum $(I_{Cs\text{-}peak}*\text{sgn}(\sin 2\pi ft))+I_{Cs\text{-}offset}$ then provides the reference setpoint $I_{Cs\text{-}ref}$ of the current $I_{Cs}$. A third control block 43 receives as input the discrepancy between this reference setpoint $I_{Cs\text{-}ref}$ and a measurement $I_{Cs\text{-}mes}$ of the current $I_{Cs}$. The output of the third control block 43 is thereafter used in a fourth control block 44 the function of which is to generate the control signals for the four active switches 31, 32, 33, 34, by virtue of output variables D1 and D2.

In the first embodiment (FIG. 3), there are only two possible states for the assembly formed by the first two switches (first switch 31 and second switch 32), over a switching period of the active switches, in particular because of the free wheel diodes of the switches. These two states are either state A: switch 31 open (OFF) and switch 32 closed (ON), or the inverse, that is to say state B: switch 31 closed and switch 32 open. Likewise, over the switching period, there are only two possible states for the assembly formed by the last two switches (third switch 33 and fourth switch 34), namely either state A: switch 33 open and switch 34 closed, or state B: switch 33 closed and switch 34 open.

The variable D1, respectively D2, represents the percentage of time during which the first two switches 31, 32, respectively the last two switches 33, 34, are in state A. For example, if D1=40%, this signifies that during 40% of the time of the switching period, the first two switches 31, 32 are in state A and during the remaining 60% of the time, the first two switches 31, 32 are in state B. These two variables D1 and D2 therefore make it possible to control the four active switches of the second converter 30 in a simple manner.

FIG. 4 shows a second embodiment of the second converter 30 in which an additional arm is added between the central mid-point $P_{MC}$ of the second converter 30 and the positive line 16 of the DC bus. This additional arm comprises two voltage control diodes 36, 37 linked in series, the anodes of the diodes 36, 37 being positioned toward the central mid-point $P_{MC}$ and a load capacitor $C_c$. This capacitor $C_c$ is connected between the low mid-point $P_{MB}$ of the second converter 30 and a mid-connection point $P_{MD}$ of the diodes, that is to say between the diodes 36, 37.

This additional arm makes it possible to decouple the voltages $V_{Cf}$ and $V_{Cs}$ from one another, thereby making it possible to simplify the regulation of the voltage $V_{Cf}$. Indeed, the second converter 30 henceforth exhibits a first block intended for the control of the voltage $V_{Cf}$ during the normal motor mode of operation. This first block is connected to the first output terminals 30b and comprises the switches 31 and 32, the capacitor $C_c$ and the diodes 36 and 37. The second converter 30 also exhibits a second block intended for the control of the voltage $V_{Cs}$ during the modes of recovery and of return of the energy of the storage module Cs. This second block is connected to the second output terminals 30c and comprises the switches 31, 32, 33 and 34.

During the motor mode, the third switch 33 and the fourth switch 34 remain open since there is no energy exchange with the super-capacitor $C_s$. When the first switch 31 is closed and the second switch 32 is open, then the load capacitor $C_c$ is charged by the voltage $V_{C2}$ between the central mid-point $P_{MC}$ and the negative line 17 through the diode 36. Then, when the first switch 31 is open and the second switch 32 is closed, the load capacitor $C_c$ is discharged on the voltage $V_{Cf}$ through the diode 37. This thus makes it possible to easily regulate the voltage $V_{Cf}$ to a mean value which is for example half the bus voltage: $V_{Cf}=V_{C2}=\frac{1}{2}V_B$. Thus the voltage $V_{Cf}$ is maintained constant whatever the current injected onto the DC bus by the first converter 20 and is decoupled from the voltage $V_{Cs}$ of the storage module Cs.

During the braking and return modes, the four active switches 31, 32, 33, 34 are used. The variable drive control unit generates the control signals $S_{31}$, $S_{32}$, $S_{33}$, $S_{34}$ so as to provide the opening/closing sequences for the four switches, these sequences depending on the ratio of the bus voltage $V_B$ to the voltage $V_{Cs}$ and being chosen so as to minimize the ripple of the voltage $V_{Cs}$.

Thus, the embodiment of FIG. 4 requires the addition of the extra arm but simplifies the control of the switches 31, 32, 33, 34 by decoupling $V_{Cf}$ and $V_{Cs}$.

The variant of FIG. 7 shows a filtering assembly which is connected between the positive line 16 and negative line 17 and which is composed of two capacitors $C_1$, $C_2$ hooked up in series. The central mid-point $P_{MC}$ is linked to the mid-point between the two capacitors $C_1$, $C_2$. Advantageously, this filtering assembly $C_1$, $C_2$ replaces the bus capacitor $C_B$ and the capacitor $C_1$ is in reality the filtering capacitor Cf described previously. Thus, it is possible to remove the bus capacitor $C_B$ by adding only a capacitor of smaller size $C_2$ between the central mid-point $P_{MC}$ and negative line 17, this being advantageous in terms of cost and bulk.

Moreover, the architecture proposed by the invention also makes it possible to guard against short interruptions of the exterior network 5, by permitting in this case a more significant discharging of the super-capacitor $C_s$ so as to be able to maintain the supply to the load M.

The invention claimed is:

1. A variable speed drive comprising:
    a DC power supply bus comprising a positive line and a negative line;
    an inverter module supplied by the DC bus so as to provide a variable voltage to an electric load;
    a first DC/DC converter comprising input terminals and output terminals, the output terminals of the first converter being connected in series on the positive line of the DC bus;
    a second DC/DC converter comprising input terminals, first output terminals, and second output terminals, the input terminals of the second converter being connected between the positive line and the negative line of the DC bus;
    a filtering capacitor connected in parallel to the input terminals of the first converter and to the first output terminals of the second converter; and
    an electrical energy storage module connected in parallel to the second output terminals of the second converter.

2. The variable speed drive as claimed in claim 1, wherein the electrical energy storage module comprises one or more super-capacitors.

3. The variable speed drive as claimed in claim 1, wherein the electrical energy storage module comprises one or more super-capacitors in series with a filtering inductor.

4. The variable speed drive as claimed in claim 1, further comprising a filtering assembly linked between the positive line and the negative line of the DC bus, the filtering assembly comprising two capacitors linked in series, wherein one of the two capacitors of the filtering assembly is the filtering capacitor.

5. The variable speed drive as claimed in claim 1, wherein the first DC/DC converter is a non-isolated monodirectional converter that comprises an active switch and a passive switch.

6. The variable speed drive as claimed in claim 5, wherein the passive switch of the first converter comprises a diode connected between the output terminals of the first converter, and wherein an assembly formed by the active switch and the passive switch linked in series is connected in parallel to the input terminals of the first converter.

7. The variable speed drive as claimed in claim 1, wherein the second converter comprises a non-isolated bidirectional converter that comprises a switching cell comprising four active switches linked in series between the positive line and the negative line of the DC bus, the cell further comprising a central mid-point between the second and the third active switch, a high mid-point between the third and the fourth active switch, and a low mid-point between the first and the second active switch.

8. The variable speed drive as claimed in claim 7, wherein the positive line of the DC bus and the central mid-point form the first output terminals of the second converter, and wherein the high mid-point and the low mid-point form the second output terminals of the second converter.

9. The variable speed drive as claimed in claim 8, wherein the second converter further comprises two voltage control diodes mounted in series between the positive line of the DC bus and the central mid-point, and a load capacitor linked in series between the low mid-point and a mid-point of the two voltage control diodes.

* * * * *